United States Patent [19]

Genheimer

[11] Patent Number: 4,899,234
[45] Date of Patent: Feb. 6, 1990

[54] ADAPTIVE VELOCITY PROFILE FOR DISK ACTUATOR CONTROL

[75] Inventor: Stephen R. Genheimer, Yukon, Okla.

[73] Assignee: Magnetic Peripherals Inc., Minneapolis, Minn.

[21] Appl. No.: 177,301

[22] Filed: Apr. 4, 1988

[51] Int. Cl.$^4$ .......................... G11B 5/55; G11B 21/08
[52] U.S. Cl. ............................. 360/78.06; 360/78.07; 360/78.12; 318/561
[58] Field of Search ............... 360/78.06, 78.07, 78.12, 360/78.04; 369/32, 33, 41; 318/561, 569, 571, 600, 603, 616, 618, 632

[56] References Cited

U.S. PATENT DOCUMENTS

| | | | |
|---|---|---|---|
| 4,031,443 | 6/1977 | Droux et al. | 360/78.07 |
| 4,297,734 | 10/1981 | Laishley | 318/571 |
| 4,333,117 | 6/1982 | Johnson | 360/78.07 |
| 4,488,189 | 12/1984 | Axmear | 318/571 |
| 4,544,968 | 10/1985 | Anderson | 360/78.05 |
| 4,562,562 | 12/1985 | Moriya | 369/32 |
| 4,622,604 | 11/1986 | Hashimoto | 360/78.07 |
| 4,636,883 | 1/1987 | Hashimoto | 360/78.07 |
| 4,638,230 | 1/1987 | Lee | 318/561 |
| 4,677,507 | 6/1987 | Elliot | 360/78.07 |

*Primary Examiner*—Alan Faber
*Assistant Examiner*—Steven R. Garland
*Attorney, Agent, or Firm*—Kelly Bauersfeld & Lowry

[57] ABSTRACT

A microprocessor is used to measure the performance of a disk drive during each seek operation. By measuring track crossings per unit time of acceleration the deceleration of the servo arm can be delayed as long as possible to minimize unproductive access time. A performance ratio is calculated for each seek and the look-up table values of worst case performance are modified to fit measured actual performance values.

6 Claims, 4 Drawing Sheets

ADAPTIVE VELOCITY PROFILE FOR DISK ACTUATOR CONTROL

BACKGROUND OF THE INVENTION

This invention relates to a magnetic head control apparatus for controlling the seek operation of the magnetic head in a magnetic disk apparatus.

When a disk drive shifts its head from one to another track; i.e., enters the "seek" mode, it is desirable to shift the head as quickly as possible so as to minimize unproductive time. The actuator has a design force capacity, and this force value is a limiting factor in the amount of acceleration and deceleration which may be applied to the arm assembly which carries the head.

In conventional disk drive servo control systems, a velocity profile is developed which controls motion of an actuator. Such an apparatus is shown in U.S. Pat. No. 4,636,883 to Hashimoto, the teachings of which are herein incorporated by reference. Typically, acceleration occurs at the maximum capability of the drive while the deceleration is governed by a worst case deceleration profile. This profile is developed to cover the worst case conditions of voltage, temperature, actuator torque capability, circuit errors and external shock and vibration. Each drive thus operates under the worst case seek profile regardless of its actual operation conditions or capability.

The present invention is directed at an adaptive velocity profile which maximizes the performance of each drive for each seek to decrease access times for the drive.

SUMMARY OF THE INVENTION

According to the present invention, during a track seek operation the magnetic head produces a track pulse for each track crossed on the magnetic disk. Based on the tracks crossed and time, the acceleration of the head to maximum velocity can be compared to a best and/or worst case acceleration profile to determine a performance factor. The performance factor is used to alter the velocity profile during deceleration to optimize the seek velocity.

One feature of the invention has the velocity profile selected, based on the performance factor. Another feature has the commencement of deceleration delayed from the normal worst case point of commencement to a point determined by the performance factor. Another feature has the velocity profile altered during deceleration in accordance with the performance factor.

Use of the invention effectively eliminates worst case effects of temperature, voltage, and actuator torque capability under typical operating conditions.

DETAILED DESCRIPTION OF THE PREFERRED EMBODIMENT

Figure 1:
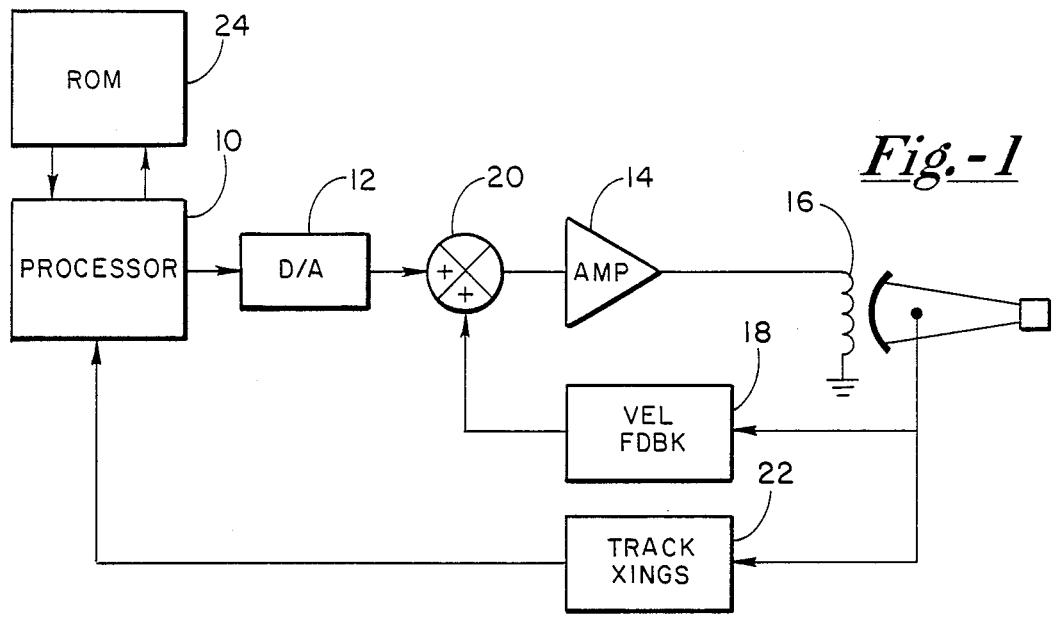
FIG. 1 is a block diagram of an access servo system.

FIG. 1 illustrates an access servo system. The purpose of an access servo system is to move an actuator from one location (track) on a disk to another in a time optimal fashion. This is typically done under control of a microprocessor 10. Microprocessor 10 issues a velocity control signal through a digital-to-analog converter 12 to the actuator control circuitry shown as amplifier 14. The voice coil actuator 16 is driven by the actuator control circuitry 14 to move the head arm assembly from one track position to another. A velocity feedback loop 18 is summed with the output of converter 12 in summing node 209 to provide velocity feedback to the voice coil actuator 16 to control its velocity. As the voice coil actuator 16 crosses data tracks on a magnetic disk a track crossing counter 22 provides count data to microprocessor 10. ROM (read only memory) 24 contains several look-up tables 24 for use within microprocessor 10.

Figure 2:
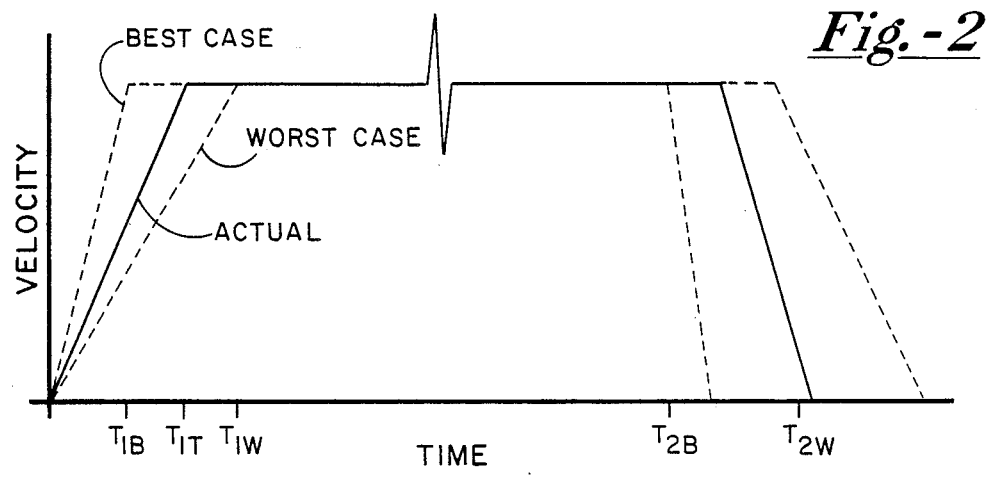
FIG. 2 is a graph of a velocity profile showing velocity versus time during a typical seek operation.
Figure 3:
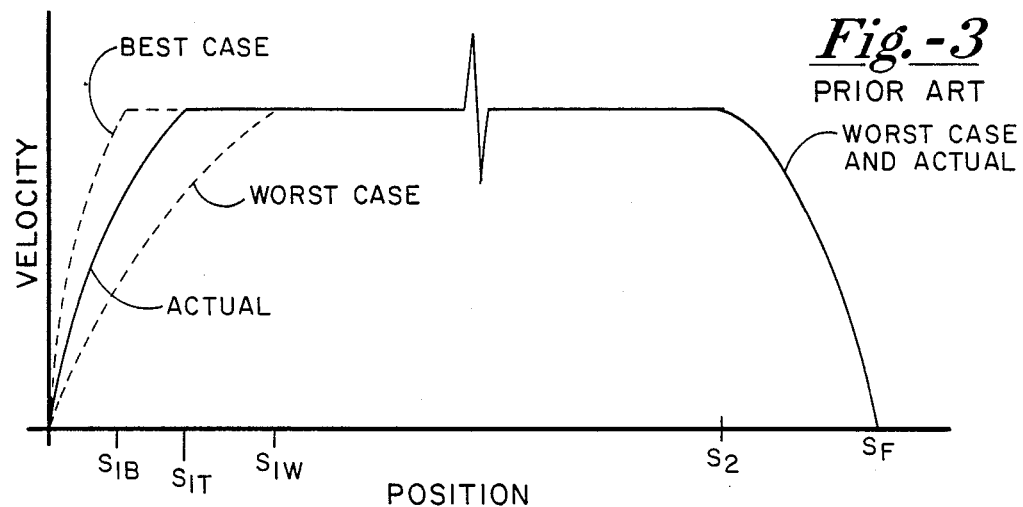
FIG. 3 is a velocity profile showing velocity versus position in a seek operation performed in the prior art.

FIGS. 2 and 3 illustrate a velocity profile experienced by the actuator while in its access or "seek" mode. FIG. 2 represents velocity as a function of time and FIG. 3 represents velocity as a function of position or track. In a typical access, the microprocessor issues a full velocity command to start the motion of the head arm assembly, and the actuator accelerates with maximum (saturated) acceleration. When the maximum velocity is reached (position $S_1$) the actuator will continue moving at this velocity until it is time to decelerate (position $S_2$). Due to variations in environmental conditions and other factors the actual time to reach maximum velocity and the actual position of the actuator at that time, may vary between a best case (B) and worst case (W) with a typical case (T) being between. Thus, if conditions permit rapid acceleration to maximum velocity, the point of maximum velocity is reached earlier ($T_{1B}$, $S_{1B}$) than if conditions were at their worst ($T_{1W}$, $S_{1W}$) Due to the variation in time and position to reach maximum velocity the time to reach the point of deceleration will correspondingly vary ($T_2$), but the position ($S_2$) where deceleration commences is dependent on worst case conditions and the desired final track position.

At the commencement of deceleration at position $S_2$, the microprocessor controls the deceleration rate by means of the velocity profile. This profile is typically stored at a table in ROM 24 and is designed such that the actuator drive under worst case conditions is capable of following the predetermined velocity profile. The microprocessor 10 determines the instantaneous actuator positions by means of track crossing signals received from track crossing detector 22. As a result, the microprocessor 10 can determine where the actuator is at any time, and which entry of the velocity profile (look-up table in ROM 24) should be used. The microprocessor also determines the position $S_2$ at which deceleration should commence for worst case conditions.

Figure 4:
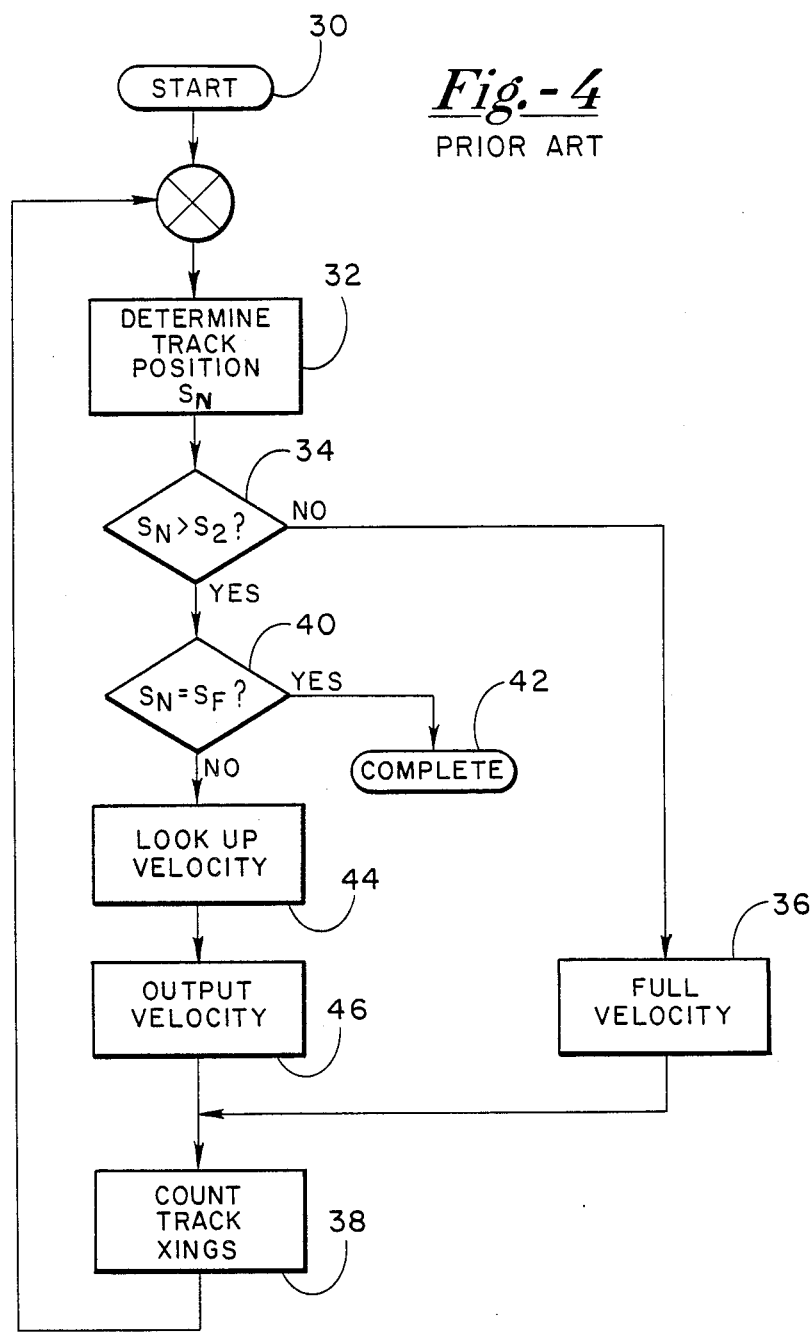
FIG. 4 is a flow chart of a conventional velocity control process.

A simplified flow chart of the process is shown in FIG. 4. A seek mode is started at the step 30 and a determination of the track position $S_N$ is made step 32. Next, a conditional statement 34 is made that the instantaneous track position $S_N$ is not greater than the saturation deceleration worst case position $S_2$, then full output velocity 36 is maintained. The track crossing is detected in step 38 and fed back to the determination of track position 32. On the other hand, if the track position is within the region of saturation deceleration worst case, then a second conditional statement 40 is determined which asks whether $S_N$ is equal to the final track destination ($S_F$). If yes, the operation is complete 42. If $S_N$ is not equal to final track destination a look-up velocity based on instantaneous position $S_N$ is made 44. From the look-up table an output velocity is determined in step 46. This continues through the track crossings detection step 38 until the final track position is achieved.

As can be determined from a view of FIG. 2 the time at which full velocity is reached will depend on the conditions of the system. Hence, the time at which position $S_2$ is reached (which is the position to commence deceleration in the worst case mode) will vary between $T_{2B}$ and $T_{2W}$. Prior systems commenced deceleration at position $S_2$ to care for worst case conditions, and deceleration was not always as rapid as possible because the actual deceleration profile followed the worst case deceleration profile, as shown in FIG. 3. Thus, in prior systems, the deceleration velocity profile forced the actuator to follow a worst case condition, even if conditions did not warrant it. The present invention overcomes this disadvantage by determining the approximate ratio of existing conditions, between best and worst case, and adjusting the position $S_2$ at which deceleration is to commence and the velocity at which deceleration is to occur. Particularly, a performance ratio is determined, based on acceleration performance, to anticipate and adjust deceleration conditions to achieve track seeking in optimal time without overshoot.

The present invention employs an adaptive velocity profile. The invention employs the same apparatus shown in FIG. 1, except that the novel implementation is a series of steps residing in firmware under control of microprocessor 10. The access is started in the same manner as in prior systems with maximum acceleration. In addition, however, the microprocessor measures the time required to accelerate by setting a timer at the beginning of the access and stopping it when the actuator reaches track $S_{1B}$ (acceleration best case). $S_{1B}$ is the track location at which a best case drive under best case conditions will reach its maximum velocity. Identification of track $S_{1B}$ is calculated from the acceleration curve of the best case velocity profile (FIG. 3) and from the identification of the present track from which the process is started. By comparing the actual time required to reach track $S_{1B}$ ($T_{AA}$—see FIG. 6) to the time required to reach track $S_{1B}$ under worst case condition ($T_{AW}$) a "performance ratio", R, can be calculated. Calculation of the time ($T_{AW}$) to reach track position $S_{1B}$ under worst case conditions is preloaded in ROM 24 during manufacture and is determined by tests and calculations performed during the design of the drive. $T_{AW}$ is determined from best and worst case measurements by determining the number of tracks crossed to reach maximum velocity under best case conditions and determining the time ($T_{AW}$) required to cross that number of tracks under worst case conditions. R, the performance ratio, is equal to $T_{AW}/T_{AA}$ and is always equal to or greater than 1. This performance ratio is an indication of how much better the drive is performing than worst case and is used to modify the velocity profile during deceleration.

Figure 5:
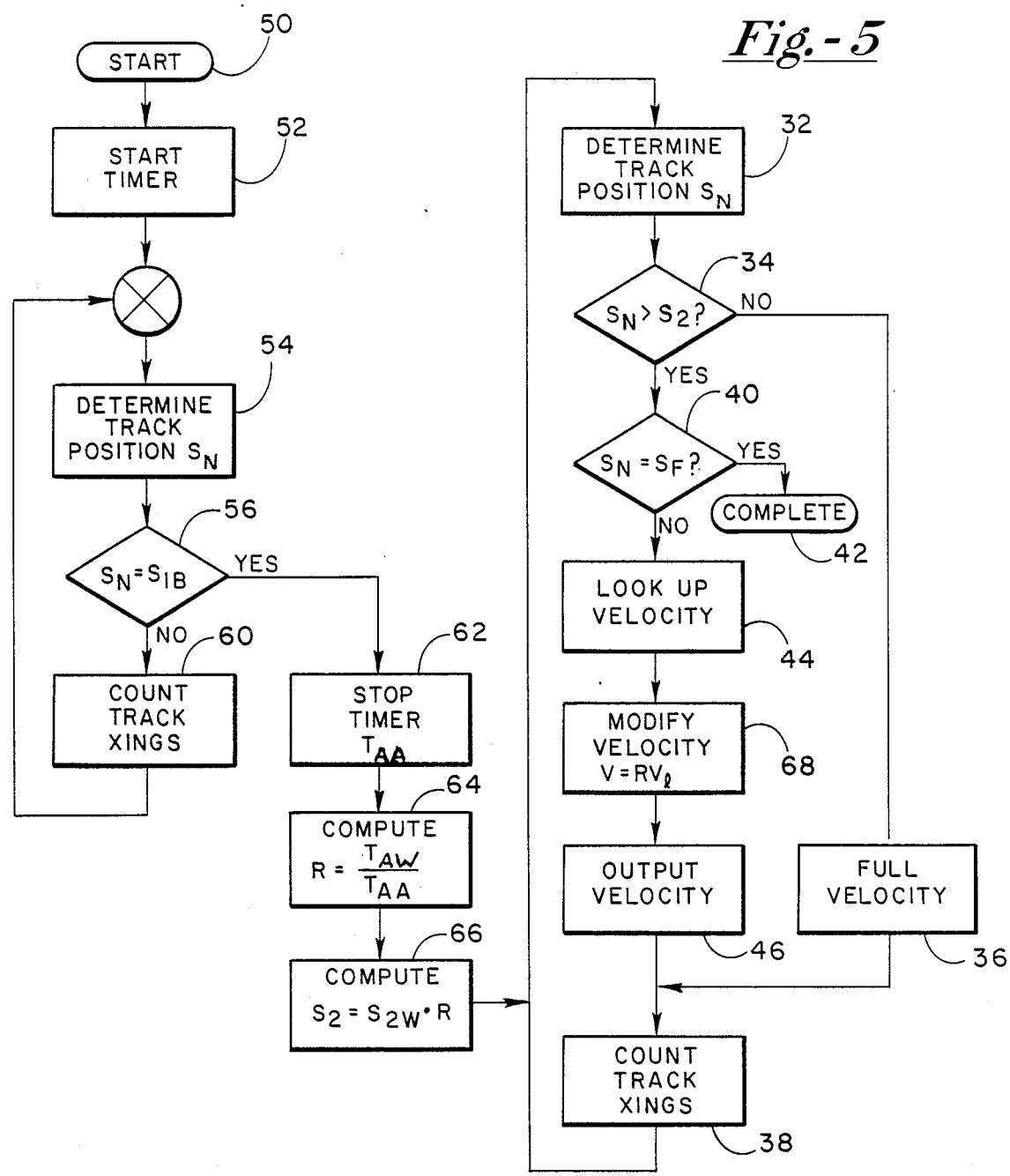
FIG. 5 is a flow chart showing the adaptive velocity control according to the present invention.

FIG. 5 is the flow chart for the process according to the present invention. The process comprises all of the steps of the prior art process described above in connection with FIG. 4, with additional modifications. Velocity during deceleration is controlled from the look-up table as in the conventional manner but is modified by the performance ratio R before being issued to the actuator 16 (FIG. 1). At the start 50 of the seek mode, timer 52 is started and a determination of the track position $S_N$ is made by conditional statement 56 to determine if the head/actuator is still within its best case acceleration region If $S_N$ is less than $S_{1B}$ (i.e., the position has not yet reached $S_N$, the detection of tracks crossed 60 is continued. For each crossing detected the track position $S_N$ is incremented at step 54. When $S_N$ reaches $S_{1B}$, timer 62 is stopped and a computation of the performance ratio, R is made 64. The performance ratio is determined from the relationship $R = T_{AW}/T_{AA}$, where $T_{AW}$ is the worst case time preloaded in the ROM and $T_{AA}$ is the actual time measured by the timer.

A new $S_2$ is determined at step 66 from the relationship $S_2 = S_{2W} R$, where $S_{2W}$ is the worst case deceleration point determined from the worst case profile preloaded into ROM 24 and the final position $S_F$.

Conditional statement 34 is modified with the new $S_2$ to effectively delay commencement of the deceleration to a point later than worst case deceleration commencement ($S_{2W}$). As a result, the track seek will continue at maximum velocity past the point of worst case deceleration to a new point determined by the performance ratio. The velocity dictated by the look-up table in ROM 24 is modified by an amount directed by the performance factor. Thus, the velocity $V_2$ from the look-up table is multiplied by the performance factor R, $V = V_L R$, where $V_L$ is the velocity specified by the look-up table for worst case.

With reference to FIG. 5, the initial track position determined at step 54 is transferred to step 32 and the position $S_{2W}$ for commencing the worst case deceleration profile is inserted into step 34 as $S_2$, as in the prior art. Upon determination of the performance ratio, R, as heretofore described, a new $S_2$ is computed, as described, and the value of the new $S_2$ is inserted into step 34 for $S_{2W}$. Assuming at this point (acceleration just completed) that $S_N$ is smaller than $S_2$, full velocity of the head continues. When $S_N$ reaches position $S_2$ (and assuming $S_N$ does not equal the destination position $S_F$), the worst case velocity profile is determined at step 44 from ROM 24, as in prior systems. However, at step 68 the velocity profile is modified by multiplying the look-up velocity, $V_L$, by the performance ratio, R. Thus, the modified velocity profile will bring the head to a stop at the desired destination track position $S_F$. For a short time during deceleration the output velocity might actually exceed maximum velocity. This can be corrected, however, by conditioning the output velocity to be no larger than the predetermined maximum velocity.

An alternative of the present invention, which is preferred over the alternative described above, is to provide several look-up tables for computation of $S_2$ and deceleration velocities for various performance ratios. The process described to the left side of FIG. 5 is employed to compute the performance ratio R. A plurality of deceleration velocity profiles are stored in the look-up tables in ROM 24 each having an assigned performance ratio. The deceleration velocity profile whose assigned performance ratio most closely matches the performance ratio calculated at step 64 is selected, and the deceleration is accomplished as described in connection with FIG. 4 with the velocity profile selected. The position $S_2$ is calculated from the final position $S_f$ and the deceleration velocity profile selected.

Figure 6:
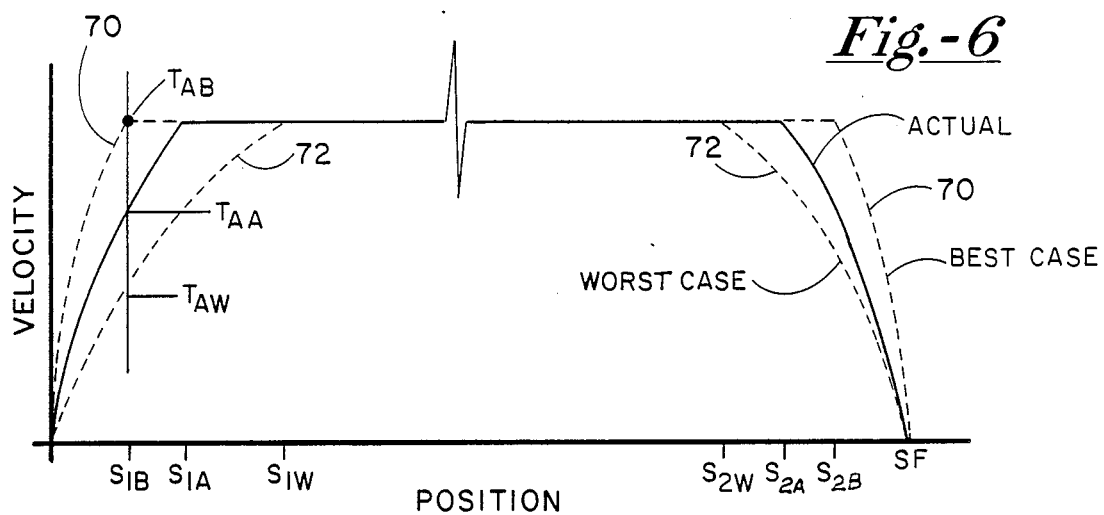
FIG. 6 is a velocity profile showing velocity versus position in a seek operation performed according to the present invention.

FIG. 6 illustrates the completed velocity profile of velocity versus position using the present invention During acceleration, the actual velocity increases as shown by the solid graph until it reaches maximum velocity at $S_{1A}$. However, the best case acceleration profile shown at dashed line 70 reaches maximum velocity at position $S_{1B}$ and at time $T_{AB}$ The actual profile shows a lesser velocity at position $S_{1B}$ at a longer time $T_{AA}$, and the worst case profile 72 shows an even smaller velocity at position $S_{1B}$ at an even longer time $T_{AW}$. The performance ratio $R = T_{AW}/T_{AA}$ is thus determined.

The point of commencing deceleration may be selected, based on the performance ratio, R, as determined from the acceleration curve, and the final position $S_F$. Therefore, as shown in FIG. 6, the actual point of commencing deceleration may occur at $S_{2A}$, which is past the position of worst case deceleration commencement $S_{2W}$. As a result, deceleration is more optimally fitted to the conditions existing with the drive, and track setting without overshoot is more rapidly accomplished.

This invention is not to be limited by embodiments shown in the drawings and described in the description, which are given by way of example and not of limitation, but only in accordance with the scope of the appended claims.

What is claimed is:

1. A servo head control apparatus comprising:
    position signal generating means adapted for driving a voice coil actuator, the voice coil actuator being located in a disk drive apparatus to move a head to a position on a specific track of a disk, the position generating means outputting a position signal indicating a present position of the head relative to the disk;
    track detection means which, based on the position signal output by the position signal generating means, outputs a track pulse for each track on the disk that is passed by the head;
    velocity detection means which, based on the position signal output by the position signal generating means, outputs a track pulse for each track on the disk that is passed by the head;
    velocity detection means which, based on the position signal output by the position signal generation means, outputs a velocity signal corresponding to the velocity signal corresponding to the velocity of the head movement relative to the disk;
    target distance calculating means which, based on the track pulse output by the track detection means, calculates the distance to a target track from the present position of the head;
    comparing means for comparing a preset limit value and the distance to the target track calculated by the target distance calculating means;
    target velocity generating means, responsive to said target distance calculating means, for generating a target velocity signal corresponding to the distance to the target track, said generating means being responsive to said comparing means to generate said target velocity signal at a predetermined value when the distance calculated by the target distance calculating means is greater than the preset limit value and at a profile value determined by a velocity profile when the distance calculated by the target distance calculating means is smaller than said preset limit value;
    ratio determining means for generating a performance factor based on acceleration of the head;
    target velocity modifying means which, based on the performance factor generated by said ratio determining means, alters the target velocity signal generated by said target velocity generating means; and
    a drive control means which, based on the target velocity signal by said target velocity generating means, drives the voice coil actuator.

2. Apparatus according to claim 1 wherein said target velocity modifying means alters said preset limit value.

3. Apparatus according to claim 1 wherein said target velocity modifying means alters said velocity profile to alter said velocity signal when the distance to the target track is smaller than said preset limit value.

4. Apparatus according to claim 1 wherein store means stores a plurality of velocity profiles and said performance factor selects one of said velocity profiles to determine said profile value.

5. The method of moving a head from a first position adjacent a first track on a disk to a second position adjacent second track on the disk, comprising
    accelerating said head to a predetermined maximum velocity,
    measuring the time required to accelerate said head to a predetermined position, the velocity of said head at said predetermined position being less than or equal to said maximum velocity,
    identifying the time required to accelerate said head to said predetermined position under "worst case" acceleration conditions,
    calculating a performance factor based on the ratio of the measured and identified times,
    identifying a third position for said head where deceleration of said head is expected to commence to halt movement of said head at said second position under "worst case" deceleration conditions,
    determining a fourth position of said head, between said third and second positions, based on the third position and said performance factor, and
    commencing deceleration of said head when said head reaches its fourth position.

6. The method according to claim 5 wherein the predetermined position is selected as the position where the head reaches the maximum velocity under "best case" acceleration conditions.

* * * * *